Oct. 24, 1933.   F. J. AKER   1,931,684
METHOD OF GRINDING CUTTERS
Filed Jan. 18, 1932   3 Sheets-Sheet 1

INVENTOR
F. J. AKER
BY
ATTORNEYS

Oct. 24, 1933.   F. J. AKER   1,931,684
METHOD OF GRINDING CUTTERS
Filed Jan. 18, 1932   3 Sheets-Sheet 2

INVENTOR
F. J. AKER
BY
ATTORNEYS

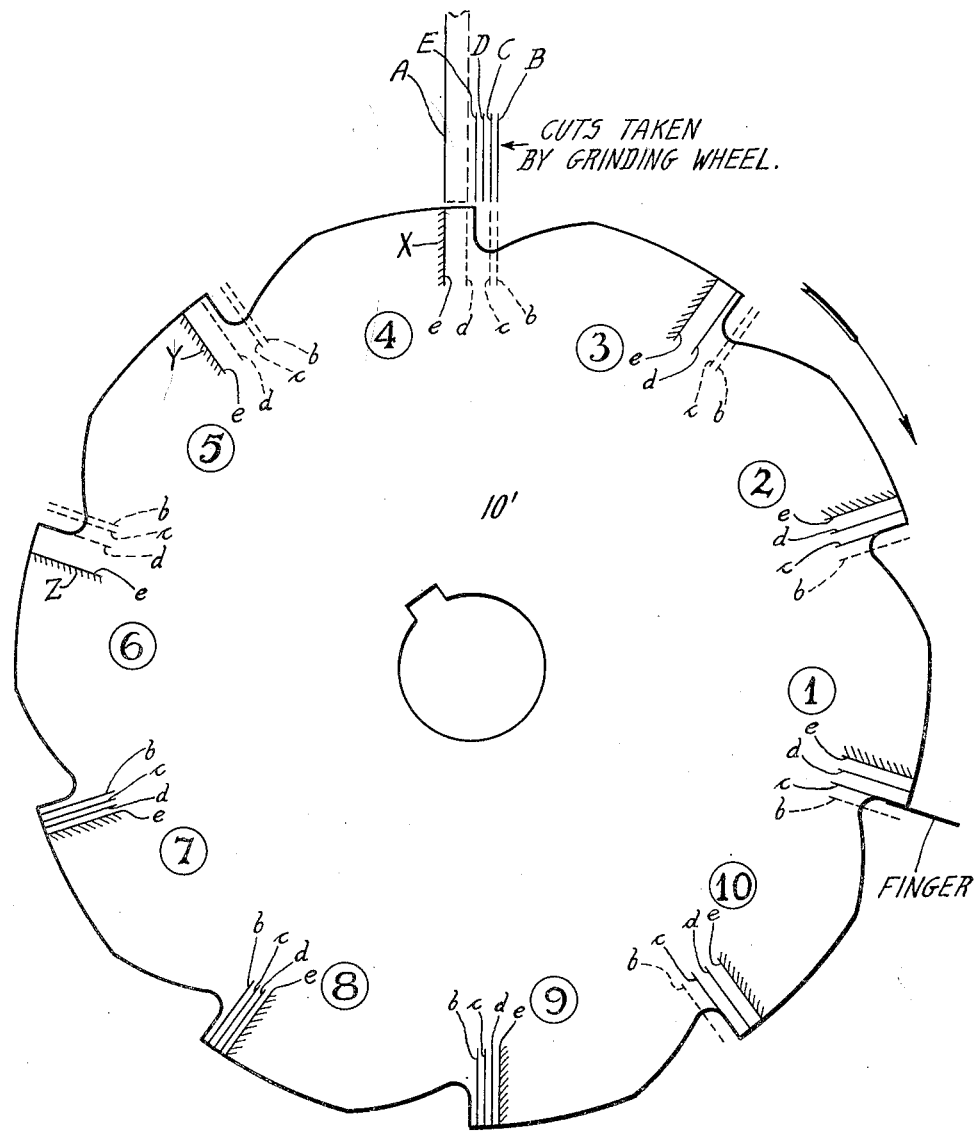

Patented Oct. 24, 1933

1,931,684

UNITED STATES PATENT OFFICE 1,931,684

METHOD OF GRINDING CUTTERS

Floyd J. Aker, Newark, N. J., assignor to Eastern Cutter Salvage Corporation, a corporation of New Jersey Application January 18, 1932. Serial No. 587,223

10 Claims. (Cl. 51—278)

This invention relates to a method of salvaging toothed cutting tools such as end mills, side mills, spiral cutters or the like.

Although the salvaging of cutting tools includes the operation of milling or grinding worn teeth to reconstruct them from the blank, such operation differs from the ordinary operation of grinding teeth as for example in the making of a gear wheel.

The gear cutting operation involves the use of mechanism arranged and constructed to generate slots in producing teeth and complicated mechanism is employed to index with extreme accuracy and the blank must be accurately divided initially and the initial accuracy maintained.

When making a cutting tool it is desirable to have the spaces between the teeth equal and the teeth of equal length but if a grinding operation is performed on a cutter with teeth unevenly spaced, material removed from one tooth may be added to the next tooth and so on until the spacing is equalized.

In accordance with the present invention advantage is taken of the above and it is an object of the present invention to provide a method whereby a cutter may be ground with an extremely fine degree of accuracy between the teeth and in the width of the teeth in an expeditious and efficient manner.

Another object of the invention is to provide a method conveniently utilizing power means to perform a grinding operation.

Another object of the invention is to provide a simple method of grinding which unskilled operators may easily practice to produce accurately dimensioned toothed cutting tools.

Another object of the invention is to provide a series of manipulative steps applicable to the semi-automatic grinding of a cutter to produce teeth of equal spacing.

Other objects and advantages of the invention will be more clearly understood by reference to the following description together with the accompanying drawings in which Fig. 1 is an end view of a spiral ten tooth cutter with a grinding wheel indicated in position to grind a tooth with a finger in position on a tooth spaced three teeth from the tooth being ground;

Fig. 9 is a schematic view of a cutter showing successive cuts indicated by radial lines taken when practicing the present method.

Figure 1:
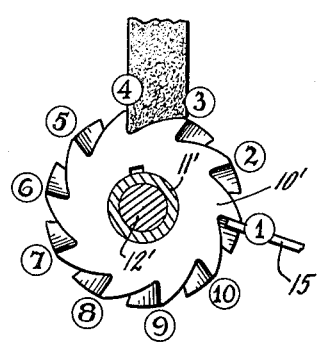
Figure 2:
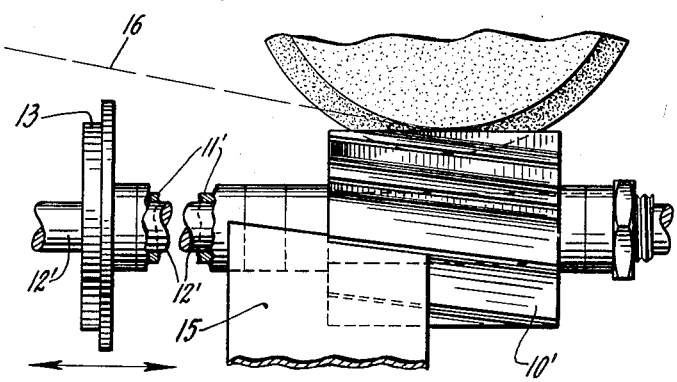
Fig. 2 is a side view of the cutter shown in Fig. 1 but shows the means whereby the cutter may be moved back and forth for a grinding operation.

Heretofore considerable difficulty had been encountered in the grinding or salvaging of cutters which are of high speed steel, since it is to be understood that in order to make the grinding of cutting tools profitable it is necessary to perform a salvaging operation at low cost. Salvaging operations as previously practiced involved a considerable amount of time and labor and as the cost of new cutters was lowered, such cost approached the cost of the salvaging operation, making the latter operation unprofitable.

The salvaging cost is further imposed upon when it is desirable to produce a salvaged cutter having accuracy and uniformity. When this result is attained as it is by reason of the present invention, then a salvaged cutter becomes a more desirable tool than a new cutter.

The reason for such condition is because a new cutter must be hardened after the teeth have been cut in which case the ends of the teeth having a relatively small amount of material may be hardened too much and become brittle. When these new teeth have chipped off or worn down, the new teeth ground from the remaining blank usually have a uniform degree of hardness and are superior in service to the first formed teeth. Furthermore, a worn cutter has proven its durability in actual use and is not likely to crack under sudden stress.

As above mentioned therefore a cutter ground with accuracy of spacing and uniformity of teeth by reason of the present method, gives a new and useful result in providing a salvaged cutter which if not better, is equal to a new cutter and which is producible at such cost as to make the salvaging of cutting tools desirable and profitable.

When practicing the present method a toothed cutting tool is arranged so that a grinding wheel may be drawn along a slot adjacent to a worn tooth while the cutter is held in position by an engagement between another tooth and a rigid finger or guide. The cutter to be ground may be slidably mounted and rotatable on an arbor so disposed as to bring a given tooth of the cutter into position for a grinding operation.

Mechanism for supporting the cutter as well as co-operating mechanisms to enable an operator to readily practice the present method is shown and described in my copending application Serial No. 587,224, filed January 18, 1932.

As shown in the accompanying drawings a cutter 10' may be mounted on a sleeve 11' slidable on an arbor 12'. If desirable the cutter may be mounted directly on the arbor but in certain cases a sleeve as shown is preferable. The sleeve is provided with a hand piece 13 to enable an operator to move the cutter back and forth on the arbor 12' beneath a grinding wheel 14 which rotates in a vertical plane above the cutter to be ground.

A guide member or finger 15 is arranged to engage a tooth and by reason of the selected relative positions of the grinding wheel and finger the pressure of the wheel holds a tooth against the finger so that as the grinding wheel is operating the tooth engaging the finger will determine the cut since the cutter is free to rotate on the arbor and the face of a tooth being ground will be adjusted in accordance with the contour of the finger.

The operator is positioned in front of the cutter, that is, in front of the hand piece 13 so that he may conveniently slide the cutter back and forth. His line of sight indicated by reference character 16 in the drawings is such that he has a clear view along the tooth being cut and can watch the grinding wheel as it cuts and can readily observe the relative position of the grinding surface of the wheel with respect to the surface being ground.

That is, as he draws the cutter toward him against the wheel for a grinding operation he can not only "feel" or judge the depth of cut but if the wheel runs free he can observe the space between the wheel and the cutter. This is of advantage in practicing the present method since when a cutter is being ground certain teeth are cut while at times certain teeth pass the wheel during a particular rotation of the cutter and are not ground while other teeth are presented for a grinding operation.

It is to be noted that in the present method the grinding wheel is rotated so as to cut or grind against the movement of the work. This is contrary to known practice giving the operator the maximum benefit of the grinding power of the wheel and is only possible without burning by reason of novel manipulative steps of the present method.

The present method is applicable to cutters having any number of teeth, cutters used in common practice, however, usually have eight teeth or more and as a practical example the following description considers a cutter having ten teeth.

A ten tooth cutter as received may have the teeth worn down and obviously when reground the diameter of the cutter will be different from that when first sold. This is, however, taken care of by grinding the cutter to the next selected standard or requested diameter.

The cutter 10' is placed on the arbor and the finger 15 is set to engage tooth 1. The teeth have been numbered 1 to 10 for convenience in connection with the following description. The finger as shown is spaced three teeth away from the tooth face 4 to be ground. The advantage of and reason for selecting the spacing of these teeth will be given hereinafter.

Heretofore when a cutter was received to be salvaged a grinding wheel was set to take a given cut from each tooth assuming that the teeth were all equally spaced and with this practice if the assumption was wrong any inaccuracies that occurred were amplified or repeated in the salvaged tool.

The present method, however, serves to correct any inaccuracies in the spacing of the teeth on the tool being ground and the finger, in conjunction with the grinding wheel, serves to constitute a gauge, which by reason of the present invention, is adjustable and an important feature of the present method is the idea of varying the space relation of the finger and wheel and in being able to so adjust them as to bring the dimension of their distance apart equal to either a distance divisible equally into the pitch circumference of the cutter being ground or a distance equal to a plurality of equal parts of the pitch circumference.

It will be understood that by equal parts is meant a number of spaces between the faces of teeth, each face being an equal fraction of the pitch circumference as when the cutter has ten teeth each space will equal one tenth of the pitch circumference and if the wheel and finger are separated by three teeth their distance apart will be three tenths of the pitch circumference. The end sought therefore by adjusting the wheel and finger is to bring them to coincide with the faces of teeth ground to the required accurate spacing. When this spacing is attained the teeth will have been automatically spaced in proper accurate relation.

With the finger 15 on tooth face 4 the finger may be adjusted so that the wheel grinds off or takes a cut of say .005 of an inch. This cut may be more or less and is selected to take care of variations in the spacing between the teeth and permit their readjustment about the pitch circumference.

The operator then pulls the cutter forward, i. e., toward him and against the rotation of the wheel so that as the cutter is moved the finger holds it as the wheel grinds off material to the depth selected.

The operator then moves the cutter backward or away from him until it clears the wheel and finger, at which time he rotates to bring the finger against tooth face 2 and he again pulls the cutter forward for a grinding operation to grind the face of tooth 5. He repeats this operation to grind tooth face 6.

When he comes to face 7, face 4 will engage the finger 15. Now since .005 has been removed from face 4, face 7 would have .010 removed if the space between the wheel and finger remains constant and the wheel would take a heavy cut. This cut is instantly felt by the operator who then adjusts the wheel and finger so that only a slight cut will be taken from face 7.

In the diagrammatic view Fig. 9 a cutter is shown and the line of the first selected cut is indicated by the reference character A and the initial cuts taken on faces 4, 5 and 6 are indicated by $x$, $y$ and $z$ respectively. The positions of the wheel when taking the following cuts are indicated by lines B, C, D and E.

The slight cut taken on face 7 is indicated by $b$. Having set the wheel to take cut $b$ from face 7 the operator continues to rotate the cutter and grind the other faces progressively rotating the cutter in the direction of the arrow or toward the finger.

It will be noted that cuts $b$ will not be taken from all the faces. Where such cut is not taken it is indicated by a dotted line and when taken, by a full line.

Following the operation it will be seen that faces 7, 8 and 9 will be ground and that the faces of the other teeth will pass the wheel without touching.

When all the teeth have passed the wheel and no grinding operation is occurring, the operator will have an indication that it is time to make another adjustment between the finger and the wheel.

This adjustment may be made at any time, that is, on any tooth but for the purpose of convenience it can be considered that when face 4 is again on the finger the wheel is adjusted to take cut $c$ from face 7. Repeating the above operation the operator will grind faces 7, 8, 9, 10, 1 and 2.

Cut $d$ is then taken from faces 7, 8, 9, 10, 1, 2 and 3. All the faces have been ground after the adjustment of the wheel and finger except faces 4, 5 and 6 which had an initial deep cut but the space between the finger and the wheel is gradually approaching a distance which will include faces 4, 5 and 6. The operator by reason of his position and the arrangement of the wheel and cutter support can observe that the three heavy cut teeth are approaching the wheel to be ground.

Cuts may be taken and the operator will be able to observe the grinding wheel getting close to faces 4, 5 and 6 and can gradually adjust the wheel until cut $e$ is taken which will coincide with faces 4, 5 and 6 and thereby result in a spacing which is equal to three tenths of the pitch circumference.

It will be understood that in the diagram shown the cuts are greatly exaggerated and that in practice although the cuts taken may be considered heavy or light they are in many cases too fine to be illustrated.

Figure 6:
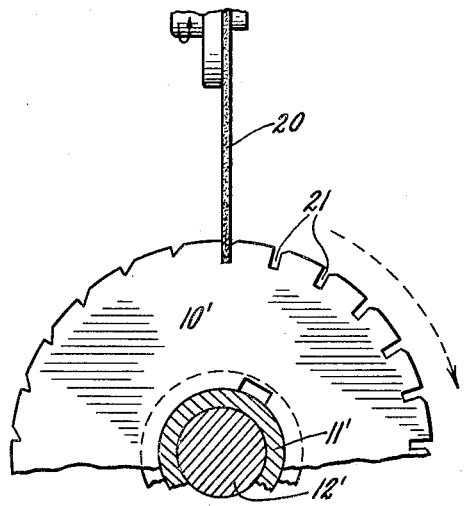
Fig. 6 is a side fragmentary view of a cutter and a gashing wheel, on the left side of the cutter the teeth are shown as worn down and on the right side are shown slots produced by the gashing wheel.
Figures 7, 8:
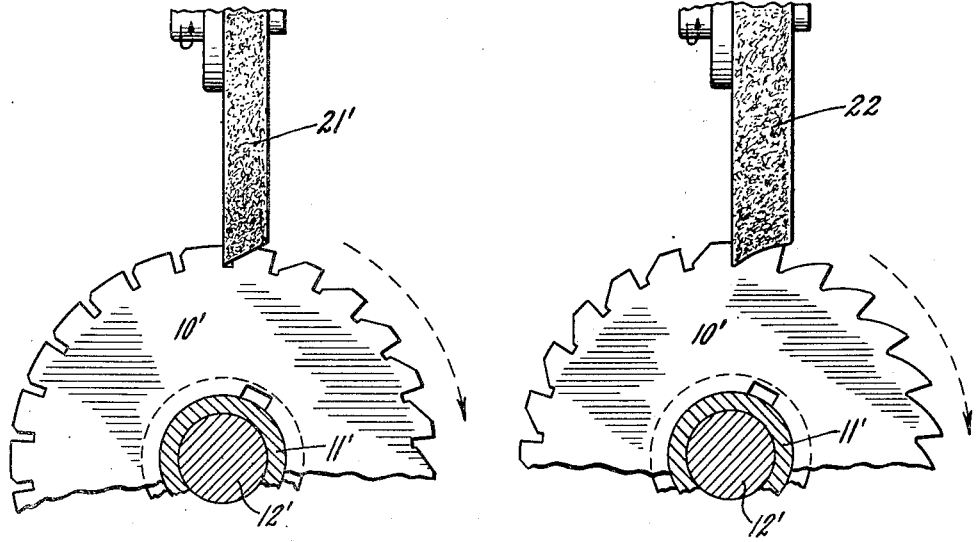
Fig. 7 shows a fragmentary view of a cutter with a roughing wheel in position and showing some of the teeth roughly formed.
Fig. 8 shows a fragmentary view of a cutter with a finishing wheel in position and showing some of the finished teeth.

After the wheel 20 (see Fig. 6) which is termed a gashing or saucer wheel has equalized the faces of the teeth the slots 21 may be cut to the depth required as shown. A roughing wheel 21 (see Fig. 7) may then be used to take off a portion of the teeth to be formed after which a finishing wheel 22 as shown in Fig. 8 may be employed to shape the teeth. By reason of the present method this last operation may be accomplished quickly and easily since the teeth have already been properly spaced and the operator need only attend to the grinding.

Figure 3:
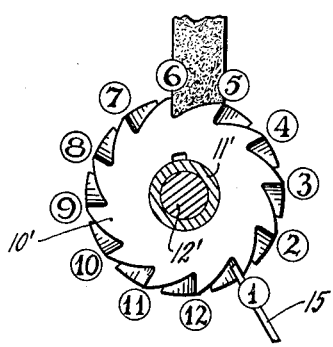
Fig. 3 is a view similar to Fig. 1 but shows a cutter having twelve teeth and the finger spaced five teeth from the tooth being ground.
Figure 4:
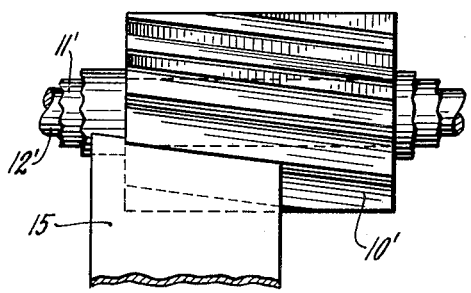
Fig. 4 is a side view of the cutter and finger shown in Fig. 3.

The foregoing method has been described as applied to a ten tooth cutter but as mentioned it may be practiced to grind a cutter of any number of teeth. Figs. 3 and 4 show a twelve tooth cutter and the finger 15 is shown as engaged with tooth face 1 and wheel with face 6. It has been found desirable to follow a rule in placing the finger and on cutters above eight teeth it has been found that if the teeth are of an even number the finger should set to index an odd number of spaces providing said number is not equally divisible into the total number of teeth on the cutter; for an odd tooth cutter set the finger to index an even number of spaces.

Figure 5:
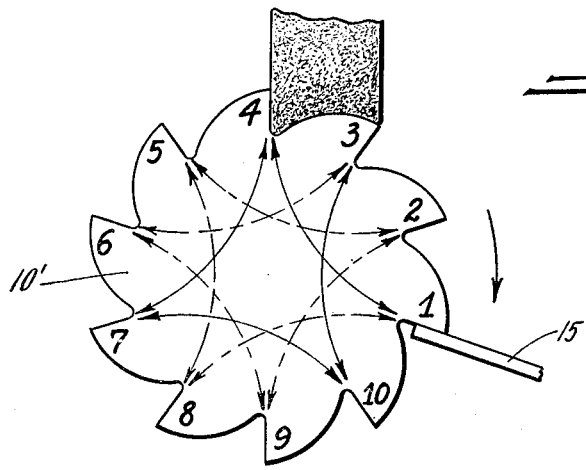
Fig. 5 is a diagrammatic end view of a ten tooth cutter with arrows indicating the progressive relation of teeth ground to the teeth engaging the finger.

The above rule is of more advantage when it is desirable to index a given number of spaces for each cut as for example when a ten tooth cutter is ground and the finger is on 1 the cutter may be indexed from 1 to 4, 4 to 7, 7 to 10, 10 to 1 etc. as indicated in Fig. 5 so that if this procedure is followed every tooth will be presented for a grinding operation whereas if the proper spacing for the index is not selected certain teeth will be omitted.

The method above described considers a movement of the cutter toward the finger and this mode of operation has in practice been found preferable. It is to be understood, however, that the method may be practiced by moving the cutter in the opposite direction. Furthermore although the finger is shown as set to engage a tooth spaced by a plurality of teeth from the grinding wheel, if desirable the finger may engage the tooth next adjacent to the one being ground.

It may happen that a cutter may be received on which one or more teeth are out of spaced relation to an excessive degree and in practice therefore it may be desirable to first check for such abnormal variations. When the cutter is mounted on the arbor and the finger engages a tooth the grinding wheel may be moved so that it is in close relation to the face of a tooth. By reason of the present arrangement of parts in the machine the operator is able to quickly and conveniently observe the degree of space between the wheel and the surface to be ground.

With the wheel in close proximity to the surface of one tooth the operator proceeds to bring the teeth progressively to position adjacent to the wheel. As each tooth is positioned a variation in the space between wheel and tooth face will be apparent since as above set forth the operator is so positioned as to have a line of sight along the teeth and he may make an adjustment to bring the wheel and faces in such relation as to take off the high spots or to trim the faces of the teeth as a preliminary step in practicing the present method.

The variations in the teeth may be very small and the trimming operation may not be necessary. It will be evident, however, that ordinarily with the usual method of grinding, slight inaccuracies would be built up whereas with the present method they are corrected.

It will be readily appreciated that the present invention makes it possible for an unskilled operator to impart a degree of accuracy to a cutter that would otherwise require complicated mechanism including marker gauges indexing heads and the skill in using these instruments, whereas by following the present method it is possible without expensive equipment to attain the desired result at low operating and maintenance cost.

Although a preferred embodiment of the invention is described and shown herein, it is to be understood that modifications may be made therein without departing from the spirit and scope of the invention as set forth in the appended claims.

What is claimed is:

1. The method of forming teeth in a cylindrical blank which comprises gashing the blank to provide a given number of slots disposed in approximately equal space relation, removing a determined amount of material from a side of one slot with an abrasive element, while engaging the side of another slot with a guide member having a fixed position with respect to said element during said grinding operation, relatively moving the blank and guide to bring the guide into contact with the ground portion of the blank, changing the relative positions of the said element and guide to cause said element to remove a lesser amount of material from another tooth and in successively grinding all the teeth except the initially ground tooth by changing the space relation between the grinding element and the guide until such space is of a dimension equal to one or more equal parts of the pitch circumference of the teeth.

2. The method of grinding toothed cutters which comprises positioning a grinding wheel to take a cut of a given depth from a tooth of a cutter while a finger engages a tooth spaced a plurality of teeth from the tooth being ground, moving the teeth successively toward the finger and grinding teeth presented to the grinding wheel, continuing this operation until a ground tooth engages the finger and in adjusting the space relation between the grinding wheel and the finger to a distance equal to the initial spacing minus a distance equal to a fraction of the depth of the first cut and in alternately grinding teeth and adjusting the space relation between the wheel and finger until the space between the finger and an initially ground tooth is equal to the space between the finger and one of the remaining teeth.

3. The method of grinding toothed cutters which comprises positioning a grinding wheel to take a cut of a given depth from a tooth of a cutter while a finger engages a tooth spaced a plurality of teeth from the tooth being ground, moving the teeth successively toward the finger and grinding teeth presented to the grinding wheel, continuing this operation until a ground tooth engages the finger and in adjusting the space relation between the grinding wheel and the finger to a distance equal to the initial spacing minus a distance equal to a fraction of the depth of the first cut and progressively grinding the teeth and adjusting the space relation between the grinding wheel and the finger until the space therebetween is equal to the distance between a plurality of equally spaced teeth.

4. The method of grinding a worn cutter tool which comprises, supporting the tool for rotation about and reciprocal movement along its longitudinal axis, positioning an abrasive element to grind the surface of one of the teeth of the tool, engaging a finger with another tooth spaced a distance equal to more than one tooth from the first tooth, moving the tool along its axis to take a cut of a definite depth from a tooth, rotating the cutter to successively grind teeth until a ground tooth reaches the finger and then in adjusting the space relation between the abrasive element and the finger until the distance therebetween equals the initial space between said element and finger minus the depth of the first cut plus a fraction of the depth of the cut taken on the first tooth ground, grinding the remaining teeth, again adjusting the space relation between the abrasive element and the finger to increase the depth of cut, grinding all teeth which engage said element when the cutter is rotated and repeating the adjusting and grinding operation until the abrasive element has ground the surfaces of all teeth to equalize the spacing therebetween.

5. The method of grinding a toothed cutting tool by positioning a grinding element to take a cut of a given depth off of one tooth while engaging a guide element with another tooth, which comprises selecting a spacing of a given number of teeth between said elements, moving the teeth toward the guide element and progressively grinding the teeth presented to the grinding element, maintaining the spacing between said elements constant until a ground tooth engages the guide element alternately adjusting the space relation between said elements and grinding teeth until the space between said elements equals a plurality of equal parts of the pitch circumference of the cutter.

6. The method of equalizing the space between the teeth of a toothed cutting tool which comprises, positioning the tool for rotation about its axis engaging a tooth thereof with a finger, moving a grinding wheel in close proximity to another tooth, rotating the cutter to position each tooth in close proximity to the grinding wheel while maintaining the space relation between the wheel and finger, to cause a removal of material from teeth engaged by the wheel and in relatively adjusting the wheel and finger to cause the wheel to grind material from unequally spaced teeth.

7. The method of equalizing the space between the teeth of a toothed cutting tool which comprises, positioning the tool for rotation about its axis engaging a tooth thereof with a finger, moving a grinding wheel in close proximity to another tooth, rotating the cutter to position each tooth in close proximity to the grinding wheel while maintaining the space relation between the wheel and finger, to cause a removal of material from teeth engaged by the wheel and in relatively adjusting the wheel and finger to cause the wheel to grind material from unequally spaced teeth taking an arbitrary cut from one tooth, moving said tooth to engage the finger, adjusting the space relation between the wheel and finger to take a light cut, rotating the cutter to apply teeth to the wheel until no cuts are taken adjusting the wheel and cutter to take another light cut and repeating the last mentioned operations until the teeth are equally spaced.

8. The method of equalizing the spaces between the teeth of a cutting tool which comprises spacing a grinding wheel a given distance from the face of a selected tooth on the cutter, causing the wheel to take a cut of a given depth from the face of another tooth, spacing the wheel from the face of the ground tooth to take a cut of lesser depth from the remaining teeth and in alternately taking cuts and changing said spacing until the faces of said remaining teeth have material removed therefrom of a depth equal to the depth of the first cut.

9. The method of equalizing the spaces between the teeth of a cutting tool which comprises, engaging one tooth with a stop member held in such relation to a grinding wheel positioned so as to take a cut of a given depth from another tooth, changing the space relation of said member and wheel to cause said wheel to take a cut of lesser depth from another tooth when said ground tooth engages said member, rotating said tool to cause said wheel to take said lesser cut from the remaining teeth and in alternately changing the space relation and cutting said teeth until said wheel and member attain a predetermined space relation.

10. The method of equalizing the spaces between the teeth of a cutter which comprises, rotating an abrasive wheel, moving a cutter to bring a tooth into grinding relation with the wheel while maintaining a clear line of sight along the tooth to be ground, engaging another tooth with a finger to hold the cutter during a grinding operation, adjusting the wheel and finger to bring the wheel in close proximity to a tooth, progressively bringing the other teeth in close proximity to the wheel, observing the variation in the space relation between the teeth and wheel and in adjusting the finger and wheel to cause the wheel to remove material from teeth of unequal spacing.

FLOYD J. AKER.